United States Patent
Cohen et al.

(10) Patent No.: US 9,822,769 B2
(45) Date of Patent: Nov. 21, 2017

(54) METHOD AND APPARATUS TO PRODUCE HIGH SPECIFIC IMPULSE AND MODERATE THRUST FROM A FUSION-POWERED ROCKET ENGINE

(71) Applicants: PRINCETON SATELLITE SYSTEMS, INC., Plainsboro, NJ (US); THE TRUSTEES OF PRINCETON UNIVERSITY, Princeton, NJ (US)

(72) Inventors: Samuel A. Cohen, Princeton, NJ (US); Gary A. Pajer, Yardley, PA (US); Michael A. Paluszek, Princeton, NJ (US); Yosef S. Razin, Princeton, NJ (US)

(73) Assignees: Princeton Satellite Systems, Plainsboro, NJ (US); The Trustees of Princeton University, Princeton, NJ (US)

( * ) Notice: Subject to any disclaimer, the term of this patent is extended or adjusted under 35 U.S.C. 154(b) by 274 days.

(21) Appl. No.: 14/400,204

(22) PCT Filed: May 10, 2013

(86) PCT No.: PCT/US2013/040520
§ 371 (c)(1),
(2) Date: Nov. 11, 2014

(87) PCT Pub. No.: WO2014/031190
PCT Pub. Date: Feb. 27, 2014

(65) Prior Publication Data
US 2015/0098543 A1    Apr. 9, 2015

Related U.S. Application Data

(60) Provisional application No. 61/645,459, filed on May 10, 2012.

(51) Int. Cl.
F02K 9/08 (2006.01)
F03H 1/00 (2006.01)
(Continued)

(52) U.S. Cl.
CPC .......... *F03H 1/0093* (2013.01); *B64G 1/408* (2013.01); *F02K 9/08* (2013.01); *G21B 1/052* (2013.01); *Y02E 30/122* (2013.01)

(58) Field of Classification Search
CPC .......... B64G 1/408; G21B 1/052; G21B 1/05; F03H 1/0093; F02K 9/08; Y02E 30/122
(Continued)

(56) References Cited

U.S. PATENT DOCUMENTS

| | | | |
|---|---|---|---|
| 6,334,302 B1 * | 1/2002 | Chang-Diaz | F03H 1/0093 60/203.1 |
| 2002/0184873 A1 * | 12/2002 | Dujarric | F03H 99/00 60/203.1 |

(Continued)

OTHER PUBLICATIONS

Schulze, "Space Fusion Energy Conversion using a Field Reversed Configuration Reactor", Penn State Space Transportation Propulsion Technology Symposium, Jun. 1990, pp. 454-499.*

(Continued)

*Primary Examiner* — Jack W Keith
*Assistant Examiner* — Daniel Wasil
(74) *Attorney, Agent, or Firm* — Fox Rothschild LLP

(57) ABSTRACT

A system and method for producing and controlling high thrust and desirable specific impulse from a continuous fusion reaction is disclosed. The resultant relatively small rocket engine will have lower cost to develop, test, and operate that the prior art, allowing spacecraft missions throughout the planetary system and beyond. The rocket engine method and system includes a reactor chamber and a heating system for heating a stable plasma to produce fusion reactions in the stable plasma. Magnets produce a magnetic (Continued)

field that confines the stable plasma. A fuel injection system and a propellant injection system are included. The propellant injection system injects cold propellant into a gas box at one end of the reactor chamber, where the propellant is ionized into a plasma. The propellant and fusion products are directed out of the reactor chamber through a magnetic nozzle and are detached from the magnetic field lines producing thrust.

31 Claims, 5 Drawing Sheets

(51) Int. Cl.
  *G21B 1/05* (2006.01)
  *B64G 1/40* (2006.01)
(58) Field of Classification Search
  USPC ........ 376/130, 131, 146, 318, 909; 60/203.1
  See application file for complete search history.

(56) References Cited

U.S. PATENT DOCUMENTS

| | | |
|---|---|---|
| 2004/0095705 A1 | 5/2004 | Mills et al. |
| 2006/0198485 A1 | 9/2006 | Binderbauer |
| 2006/0254520 A1 | 11/2006 | Rostoker |
| 2008/0069287 A1 | 3/2008 | Monkhorst et al. |
| 2010/0329407 A1 | 12/2010 | Kotschenreuther et al. |
| 2011/0142185 A1 | 6/2011 | Woodruff |
| 2011/0170648 A1 | 7/2011 | Kotschenreuther et al. |
| 2015/0364220 A1* | 12/2015 | Slough ............... G21B 1/052 376/125 |

OTHER PUBLICATIONS

Williams, "Application of Recommended Design Practices for Conceptual Nuclear Fusion Space Propulsion Systems", 40th Joint Propulsion Conference, Jul. 2004, pp. 1-23.*
Brunkhorst, "The Princeton FRC Rotating-Magnetic-Field-Experiment RF System", Proceedings of the 22nd IEEE/NPSS Symposium on Fusion Engineering, SOFE 07, Jun. 2007.*
Landsman, "Onset and saturation of ion heating by odd-parity rotating-magnetic-fields in a field-reversed configuration", PRL 96, 015002 (2006).*
Petkow, "Comparative Investigation of Fusion Reactions for Space Propulsion Applications", Transactions of Space Technology Japan, vol. 7, Issue ists26, pp. Pb_59-Pb_63 (2009).*
Post, "Open Confinement Systems and the D-3He Reaction", Fusion Technology, vol. 22, Aug. 1992.*
Romanelli, "Assessment of Open Magnetic Fusion for Space Propulsion", IAC-06-C4.6.02.*
Santarius, "Magnetic Fusion For Space Propulsion", Fusion Technology, vol. 21, May 1992.*

* cited by examiner

METHOD AND APPARATUS TO PRODUCE HIGH SPECIFIC IMPULSE AND MODERATE THRUST FROM A FUSION-POWERED ROCKET ENGINE

CROSS REFERENCE TO RELATED APPLICATIONS

This application is the U.S. National Phase of international application No. PCT/US2013/040520, filed May 10, 2013 and claims priority to U.S. Provisional Application Ser. No. 61/645,459 filed May 10, 2012, which are incorporated herein by reference as if fully disclosed herein.

STATEMENT REGARDING FEDERALLY SPONSORED RESEARCH OR DEVELOPMENT

This invention was made with government support under Grant #DE-AC02-09CH11466 awarded by the Department of Energy. The government has certain rights in this invention.

FIELD OF THE INVENTION

The disclosed scenarios relate generally to the field of plasma physics and, in particular, to methods and devices for producing thrust from a fusion reactor.

BACKGROUND

Many nuclear fusion reactors have been proposed to produce thrust for rocket propulsion from the fusion of atomic particles such as deuterium, tritium, and helium.

Fusion reactors can be broadly classified as those that use magnetic confinement and those that use inertial confinement. In the former, magnetic fields from magnet external coils or produced by plasma currents confine hot plasma, allowing for steady or pulsed fusion to occur. In inertial confinement, by contrast, external particle beams or lasers compress the reactants to produce pulsed fusion.

Dozens of fusion reactor configurations have been proposed for spacecraft propulsion including tokamaks, dipoles, mirror machines, stellarators, theta-pinch, and the field-reversed configuration (FRC). One benefit of the latter is its high ratio of magnetic pressure to plasma pressure, meaning that it requires less magnetic mass than an equivalent strength tokamak. This mass savings is crucial in rocket design. Further benefits of a FRC for space propulsion are its simple, cylindrical magnet geometry and its natural diverter. This allows for a compact thruster engine in which the fusion products can be used directly for propulsion.

U.S. Patent Application Publication No. 2008/0093506 describes an electric propulsion system where a gas is injected into a chamber, ionized, and accelerated using electromagnets. Other ion thruster configurations are disclosed. These thrusters require a separate system to generate power for producing electric, magnetic, or electromagnetic fields to ionize gas and heat and accelerate the plasma thus formed.

U.S. Pat. No. 6,334,302 discloses a method to control the specific impulse of plasma thruster using two separate RF generators powering two separate RF heating sections, one before and the other after a magnetic nozzle. The source of electrical power for the RF generators is unspecified. Thrust is controlled by adding neutral gas into the plasma stream, as disclosed in U.S. Pat. Nos. 4,815,279 and 4,893,470.

European Patent No. 1 856 702 describes a p-$^{11}$B-fueled FRC that combines power and thrust production by using half of the fusion products for electrical generation and the second half for direct thrust. The former's energy is captured using an inverse cyclotron converter, while the latter particles are directed and expelled via a magnetic nozzle. The exhaust velocity of the propellant in this design in simply the velocity of the fusion products and 50% of the power goes out in thrust.

A system for modifying thrust called side-injection is disclosed in U.S. Pat. No. 3,325,103. It involved the injection of a high-speed, pencil size flow of fluid into the main thrust stream to deflect the thrust vector through the main nozzle. This system was proposed for a chemical rocket and is limited in purpose to thrust vector control through flow deflection.

Neutral beam injection is disclosed in U.S. Pat. No. 4,480,185. The process involves ionizing particles, in this case deuterium, and then accelerated into a gas cloud, where charge exchange neutralized the beam.

Teller, et al. (Fusion Technology 22, 8 (1992)), describes a D-$^3$He fueled dipole fusion reactor for spacecraft propulsion. The device is large, over 1 GW power. Insufficient $^3$He source exist on earth to fuel this engine for more than 1 month. Propellant, introduced as gas from an annular ring near the reactor's midplane, is ionized then exhausted from the plasma edge by following the field lines to a neutralizer region in a low field region where detachment of ions from the dipole's magnetic field would be accomplished by charge exchange neutralization. The decrease in magnetic field from the propellant injection region to the neutralizer region results in the transfer of most ion energy to the axial direction. The parameters of the plasma edge are determined by transport rates and stability criteria, which allow little control of thrust and specific impulse. Inefficiencies may occur due to ionization and charge exchange energy and particle losses.

Slough (49$^{th}$ AIAA Aerospace Sciences Meeting (2001)) has described several D-T fueled FRC fusion reactors for spacecraft propulsion. FRCs are formed, perhaps by the theta-pinch method, then compressed, perhaps by imploding liners or passing through constricting channels. Compression causes increase of the plasma temperature and density to such values that rapid burn (fusion) of the fuel occurs. The heated FRC plasmoid then expands and accelerates as emerges from the constricting channel. The liners are also accelerated by the expanding FRC plasmoid and contribute to the thrust. Repeated pulses could provide a time-averaged power of tens of MW.

Carpenter and Brennan (Acta Astronautica 44, (1999) 471) describe a mirror machine fusion reactor, fueled with either D-T or D-$^3$He. The 80-m-long rocket engine would produce about 4 GW of fusion power. (The large amount of $^3$He fuel required for 4 GW would cost over 300B$.) Hydrogen propellant is added to the plasma halo. No discussion is provided of how the propellant is heated or the specific impulse controlled to produce 11 kN of thrust. Neutralization of the exhaust stream is provided by charge exchange in the expansion region of the exhaust nozzle, with the aforementioned inefficiencies in power and particles. The fusion region is relatively open, to allow direct loss of radiation to space, reducing the need for a heat radiator but reducing the power available for thrust and subsystems by ~80%. As in all mirror machines, half of the fusion power flows in the wrong direction for thrust hence must fall onto to a direct convertor for making electricity.

Past proposals for fusion propulsion have had many disadvantages. Inertial confinement and the most common magnetic confinement configurations (i.e. tokamaks and stellarators) have non-linear geometries and must be very large to generate net power. Linear reactors using D-T or D-D produce so many neutrons that a lot of shielding is required and even with that, the reactor chamber, magnets, and other essential components located near the plasma are especially prone to damage and shortened-lifetime. Electric propulsion using ion thrusters produce very high specific impulse but very low thrust, leading to long mission times.

SUMMARY

A system and method for producing and controlling high thrust and desirable specific impulse from a continuous fusion reaction using a D-$^3$He fueled FRC. The resultant relatively small rocket engine will have lower cost to develop, test, and operate that the prior art, allowing spacecraft missions throughout the planetary system and beyond.

A rocket engine system employing nuclear fusion with thrust augmentation is disclosed. The engine system includes a reactor chamber for containing a stable plasma of a fusion fuel and a heating system for heating the plasma and increasing an ion energy of said plasma to produce fusion reactions in the stable plasma. A plurality of magnets are situated coaxial to the reactor chamber and produce a magnetic field that confines the stable plasma and promotes rapid loss of fusion products into a scrape off layer. A fuel injection system is also included for injecting additional quantities of said fusion fuel to sustain the power output of the fusion reactions in the plasma. A propellant injection system injects cold gas propellant into a gas box at one end of the scrape off later for producing a cold plasma which flows into the reaction chamber and is warmed there, becoming a warm propellant plasma. The propellant is used to augment the mass of the scrape off layer. A magnetic nozzle for directing said warm plasma in said scrape off layer out of the other end of the reactor chamber from said gas box creates thrust. A propellant detachment system allows the expelled propellant to separate from said rocket engine's magnetic field in a well-directed stream.

A method for augmenting the thrust of a fusion powered rocket engine described above includes injecting, by the fuel injection system, the fusion fuel into the reactor chamber and heating, by the heating system, the plasma such that the fuel is ionized such that a sustained nuclear fusion reaction occurs in the plasma producing a net power. Magnets are used to form a magnetic field to confine the plasma and promote rapid loss of fusion products into a scrape off layer. A propelling injection system injects into the gas box a cold propellant, which is converted into a warm propellant plasma to increase the mass of the scrape off layer, wherein the warm propellant plasma flows through the reactor chamber and is heated by the fusion products. Finally, the warm propellant plasma and fusion products are expelled from the reactor chamber through the magnetic nozzle. The expelled propellant particles are detached from said rocket engine's magnetic field in a well-directed stream.

DETAILED DESCRIPTION

Figure 1:
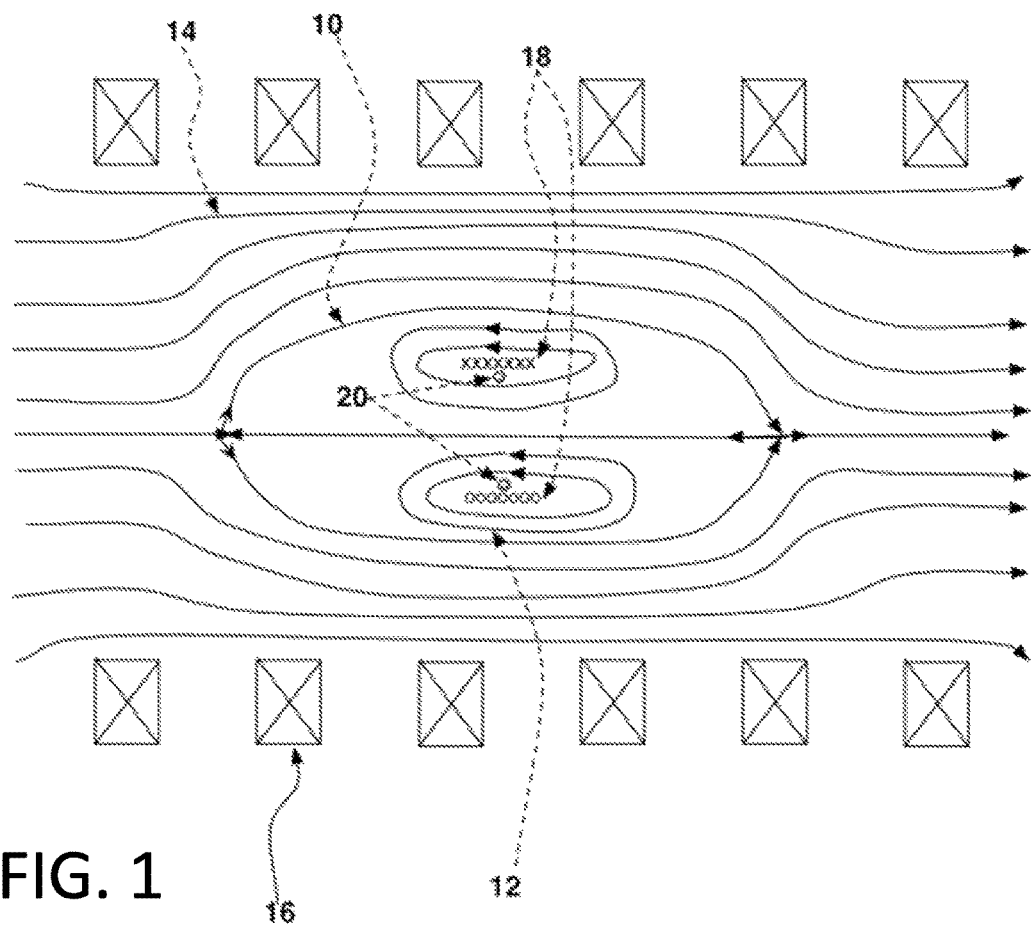
FIG. 1 shows an example magnetic field configuration for an FRC propulsion system.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the disclosed scenarios. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

During the course of this description like numbers will be used to identify like elements according to the different views, which illustrate the invention.

In nuclear fusion reactions light nuclei bind temporarily then fragment to produce fast moving reaction products comprising heavy particles, which contain vast amounts of kinetic energy. This fusion process only occurs rapidly at temperatures of 5-500 keV (58-5,800 million K) such that the Coulomb force, which repulses the positively charged nuclei, is overcome. The reactivity (i.e. rate of fusion) is a function of the ion temperature and plasma density.

The most important fusion reactions for practical reactors are as follows:

$$D+T \rightarrow \alpha(3.6 \text{ MeV})+n(14.1 \text{ MeV}), \quad \text{(Equation 1)}$$

$$D+{}^3He \rightarrow {}^4He(3.7 \text{ MeV})-p(14.7 \text{ MeV}), \text{ and} \quad \text{(Equation 2)}$$

$$D+D \rightarrow {}^3He(0.8 \text{ MeV})+n(2.5 \text{ MeV}), \quad \text{(Equation 3)}$$

where D is deuterium, T is tritium, α is a helium nucleus, n is a neutron, p is a proton, and $^3$He and $^4$He are helium-3 and helium-4, respectively. The associated kinetic energy of each product is indicated in parentheses.

The D-T reaction produces most of its energy in neutrons, which means that electrical energy can only be produced by using the neutron radiation to heat a working fluid, much like in a conventional boiler or a fission reactor. Due to temperature limitations of the working fluid, that conversion can only be about 30% efficient. An advantage of the D-T fuel mixture is that it produces net power at the lowest ion temperatures, of only 5-10 keV (1 keV=11.6 million K, and is a more convenient unit of temperature). However, the energetic neutrons liberated in this reaction represent a significant threat to the reactor's structure as the neutron flux degrades the electrical, mechanical, and thermal properties of the reactor components and also leaves many of their materials radioactive. For terrestrial power reactors, most of these energetic neutrons are used to breed tritium, a scarce material. Thus, the D-T fuel mixture poses significant challenges with radiation damage, material activation, and fuel availability. Pursuing a D-reactor would require substantial research and development of nuclear materials and tritium breeding as well as several meters worth of shielding to protect reactor components and personnel from neutron radiation.

The D-D fusion reactions are very attractive because the abundance of deuterium obviates the need to breed tritium. Moreover, the neutrons generated are fewer in number and lower in energy than from D-T per unit of energy produced. By selective treatment of D-D fusion's daughter products— removing the T from the plasma before it fuses but burning the prompt and decay-formed $^3$He, a technique called He-catalyzed D-D fusion—the neutron production can be reduced to 10% of the D-T level, per unit of energy produced.

The D-$^3$He reaction is termed aneutronic, because it directly produces relatively few neutrons and requires none for breeding. The energy from the charged reaction products may be directly converted to electrical power at a much higher efficiency than D-T. However, higher ion energies or temperatures, of 50-100 keV, are required to achieve the same reactivity as D-T. Both D-D and D-$^3$He reactions admit D-D side reactions, which for a D-$^3$He reactor is the only source of neutron production. A known method for decreasing this neutron generation is lowering the reactant concentration ratio of D-$^3$He, for example, from 1:1 to 1:9. In a thermal plasma with 100 keV ion temperatures and T ash promptly removed, this causes neutron production to drop from 2.6% to 0.5% of D-T's per unit of energy produced. This reduces the level of neutron shielding required to well under a meter. However, the lower D concentration reduces the power density by a factor of 4.5, adversely affecting the economics. A method for suppressing this neutron generation pathway was been presented in International Patent Application Serial No. PCT/US13/33767 which is incorporated by reference as if fully disclosed herein.

Among all fusion fuels, D-$^3$He is preferred for the applications described in this disclosure because it produces fewer neutrons while generating net power. Various propellants can be used for thrust augmentation including deuterium and hydrogen.

The plasma is formed within a reactor chamber, which may be small enough to accommodate ion gyroradii that are about 1/10th of the plasma radius and mostly have axis encircling orbits. This promotes the plasma stability against the tilt mode. A heating system, such as radio frequency generating magnetic coils, must be able to raise the plasma's ion energy such that fusion reactions occur. By locating multiple discrete magnets coaxially to the reactor chamber, a corrugated axial magnetic field is formed that also mediates against the unstable tilt mode.

The magnetic confinement scheme can employ either permanent magnets or magnetic coils. The magnets control the size of the plasma so that it is large enough to contain fusing plasma of sufficient power while small enough to be effectively heated and allow the fusion products to quickly move into a scrape off layer. The scrape off layer is a typical component of magnetic confinement fusion devices with internal closed field lines and is crucial for this system of thrust augmentation. It is found in tokamaks, stellarators, reversed-field pinches, spheromaks, and field-reversed configurations (FRCs).

An FRC, depicted in FIG. 1, forms a quasi-toroidal, closed-field, simply connected magnetic confinement device with open field lines exiting the reactor chamber approximately paraxially. A separatrix 10 divides the closed-field region 12 from the open-field region 14, with the latter containing the scrape-off-layer (SOL). The discrete flux conserving magnetic coils 16 provide magnetic pressure while allowing the heating method, such as an odd-parity (i.e. anti-parallel) rotating magnetic field (RMF$_o$) from external radio frequency magnetic coils, to penetrate the plasma. A toroidal current 18, centered on the O-point null line 20, is formed around the axis of the closed-field region 12.

Figure 2:
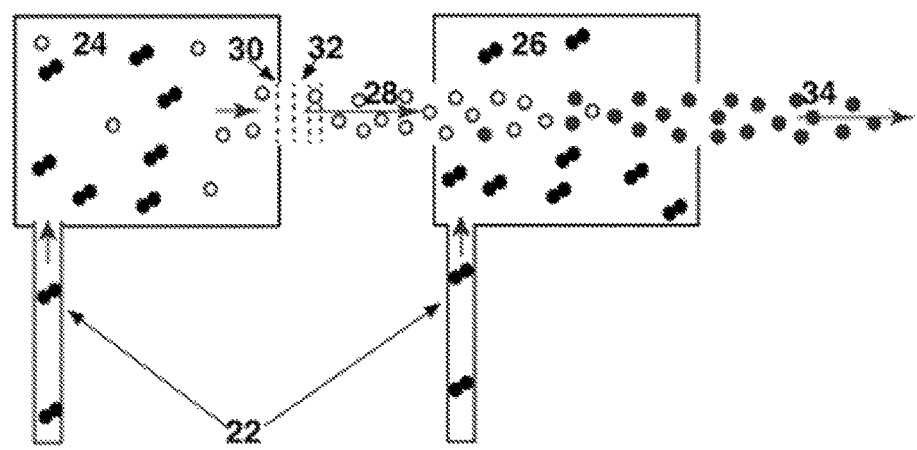
FIG. 2 shows an example technique for neutral beam injection.

Various means of fuel injection can be employed to introduce the fuel into the reaction chamber, including pellets, gas puffing, cluster, and neutral beam injection. FIG. 2 depicts neutral beam injection, which is used to feed a tight beam of energetic neutral D and $^3$He into the center of the chamber. The neutral beam is created by injecting a feedstock gas propellant 22, such as hydrogen or deuterium, into a plasma formation box 24 and charge exchange box 26. In the plasma formation box 24, the feedstock gas propellant 22 is weakly ionized. The ionized ions are ejected through an ion extraction grid 30 and then accelerated through a high-voltage ion acceleration grid 32 to form ion beam 28. Ion beam 28 then enters the charge exchange box 26 where electrons are passed from the gas cloud formed by the feedstock gas propellant 22 forming the neutral beam 34. Neutral beam 34 is then injected into the reaction chamber.

Figure 3:
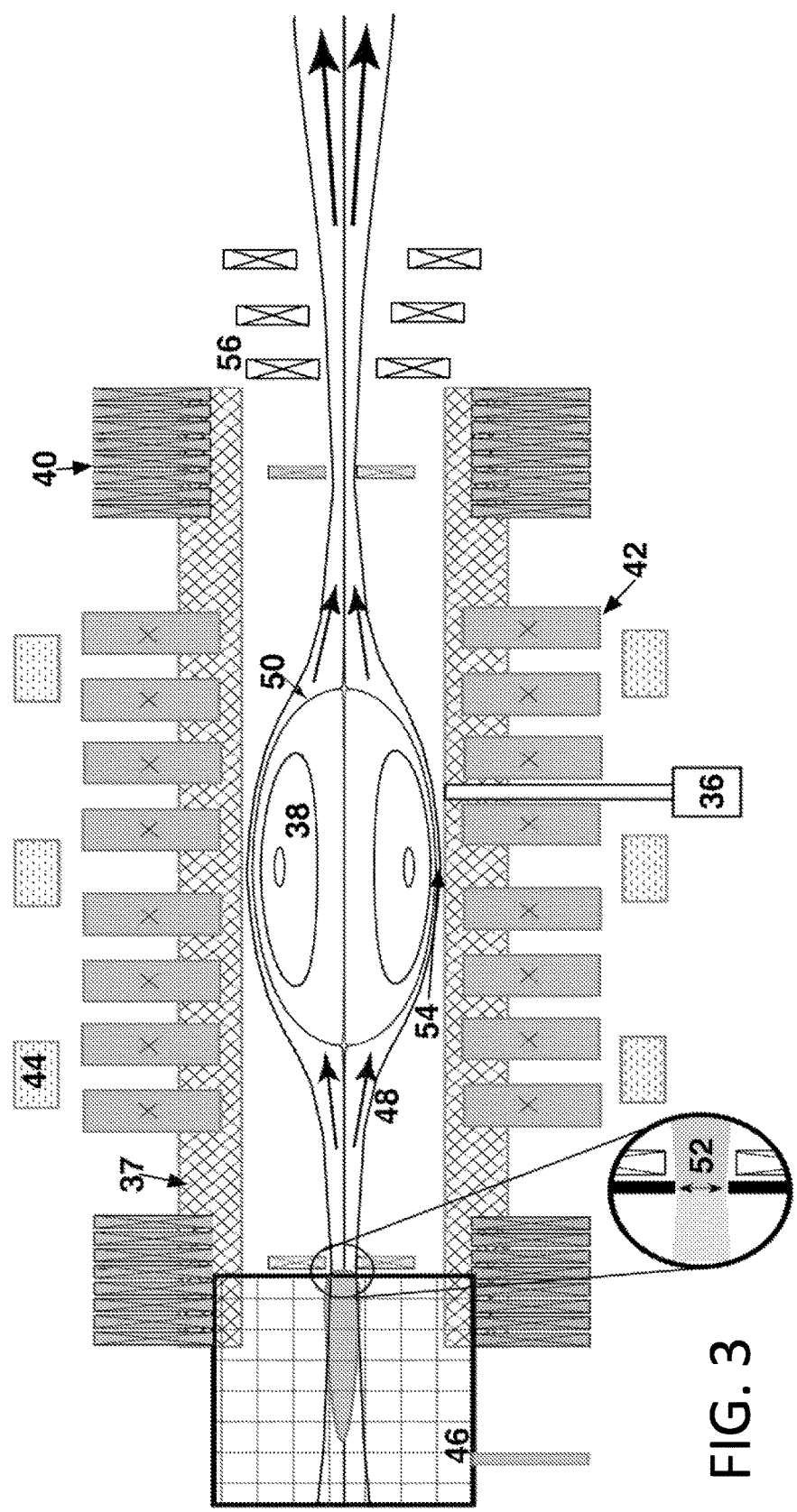
FIG. 3 shows an example configuration a fusion reactor that is designed for thrust augmentation and rocket propulsion.

FIG. 3 illustrates an FRC configured for thrust augmentation. Fusion fuel is injected 36 near the center of the reactor chamber 37. Fusion is achieved in the closed-field region 38 where the plasma is heated. In this arrangement, shaping and heating of the FRC is achieved with active 40 and passive flux conserving magnetic coils 42 and radio frequency coils 44 that create the anti-parallel components of the RMFo. Thrust augmentation is achieved by pumping deuterium or hydrogen into a gas box 46 (on the open field lines 48) where it is ionized. The cold plasma flows along the open field lines, out the box and through the SOL 50. The cold plasma density and temperature in the SOL are controlled by the rate of gas introduced into the gas box 46. Further control can be achieved by widening and constricting a variable-size orifice 52, attached to the gas box's opening. When near the FRC's midplane 54, the SOL plasma particles, e.g., the plasma electrons, are heated by the kinetic energy of the reaction products. The cooled fusion products, including tritium, deuterium, and/or hydrogen plasma, flows along the open-field-region magnetic-field lines 48 and is directed out of the engine through a magnetic nozzle 56.

Thrust control can be achieved through multiple methods. Since power P is directly proportional to the thrust T multiplied by the exhaust velocity UE, such that P=0.5TUE, thrust can be traded for exhaust velocity at a given power. The reaction products are highly energetic. For example, if the products of D-3He were used directly for propulsion they produce an exhaust velocity of 25,000 km/s. However, in such a case, the thrust-to-power ratio would be 1/12,500 Newtons per kW. This ratio can be improved and carefully controlled by the amount of cold propellant introduced into the gas box 46. Another way to control the thrust is through the variable sized orifice 52 on the gas box 46, which can alter the thickness of the scrape off layer. Finally, using different propellants changes the mass and therefore the exhaust velocity. For example, deuterium propellant would have lower exhaust velocity than hydrogen.

Figure 4:
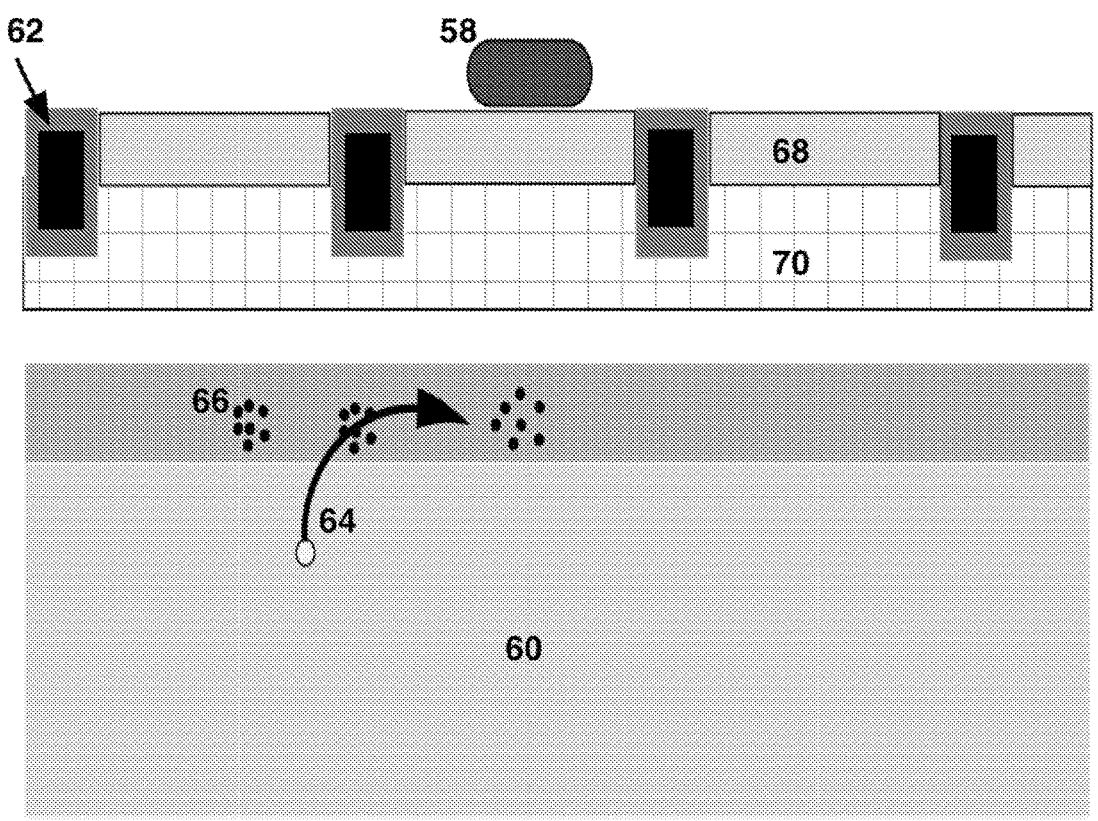
FIG. 4 shows the heating of the scrape off layer for thrust augmentation.

The actual mechanism of thrust augmentation is depicted in one possible configuration of a cross-section of such an FRC in FIG. 4. The RMF$_o$ antenna 58 produces a high power density of fusion with low neutron production within the core plasma 60. The size and magnetic field produced by superconducting magnetic coils 62 or permanent magnets are such that more than 90% of the fusion reaction products pass through the SOL 64 on their first orbit. There, they exchange energy with the warm plasma 66, increasing its velocity. Additionally, the surface-to-volume ratio of the FRC is large, reducing the neutron power-load density on the reactor chamber walls of a vacuum vessel 68 and component degradation. However, some radiation from Bremmstrahlung, synchrotron, and neutrons will occur and may be absorbed by a shield 70.

Figure 5:
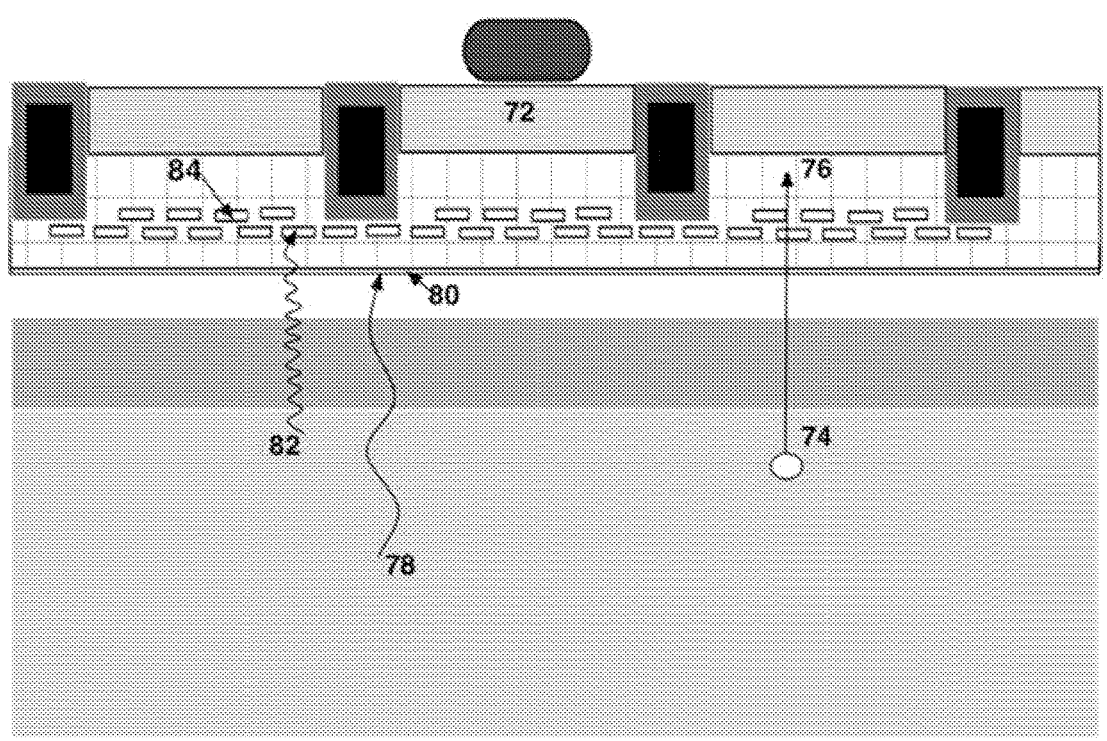
FIG. 5 shows a heat exchanger to capture radiation from fusion, for energy conversion.

Another configuration of the FRC wall is shown in FIG. 5. Multiple techniques for protecting the reactor chamber 72 are depicted. Neutrons 74 are unaffected by the magnetic field and are expelled directly out of D-D side reactions, but can cause significant damage to the reactor structure, magnets, antennae, and especially sensitive electronics. Neutron shielding 76 is usually constructed from materials with low atomic numbers, like hydrogen, water, helium, boron, and beryllium. While the Bremsstrahlung and synchrotron radiation have a fairly broad spectrum, the former is mostly released as X-rays and the latter as microwaves. Microwaves 78 are simply reflected by surfaces with low emissivity 80, i.e. that are shiny. Medium atomic weight materials can absorb X-rays 82, heating materials in heat exchangers for energy conversion 84.

Figure 6:
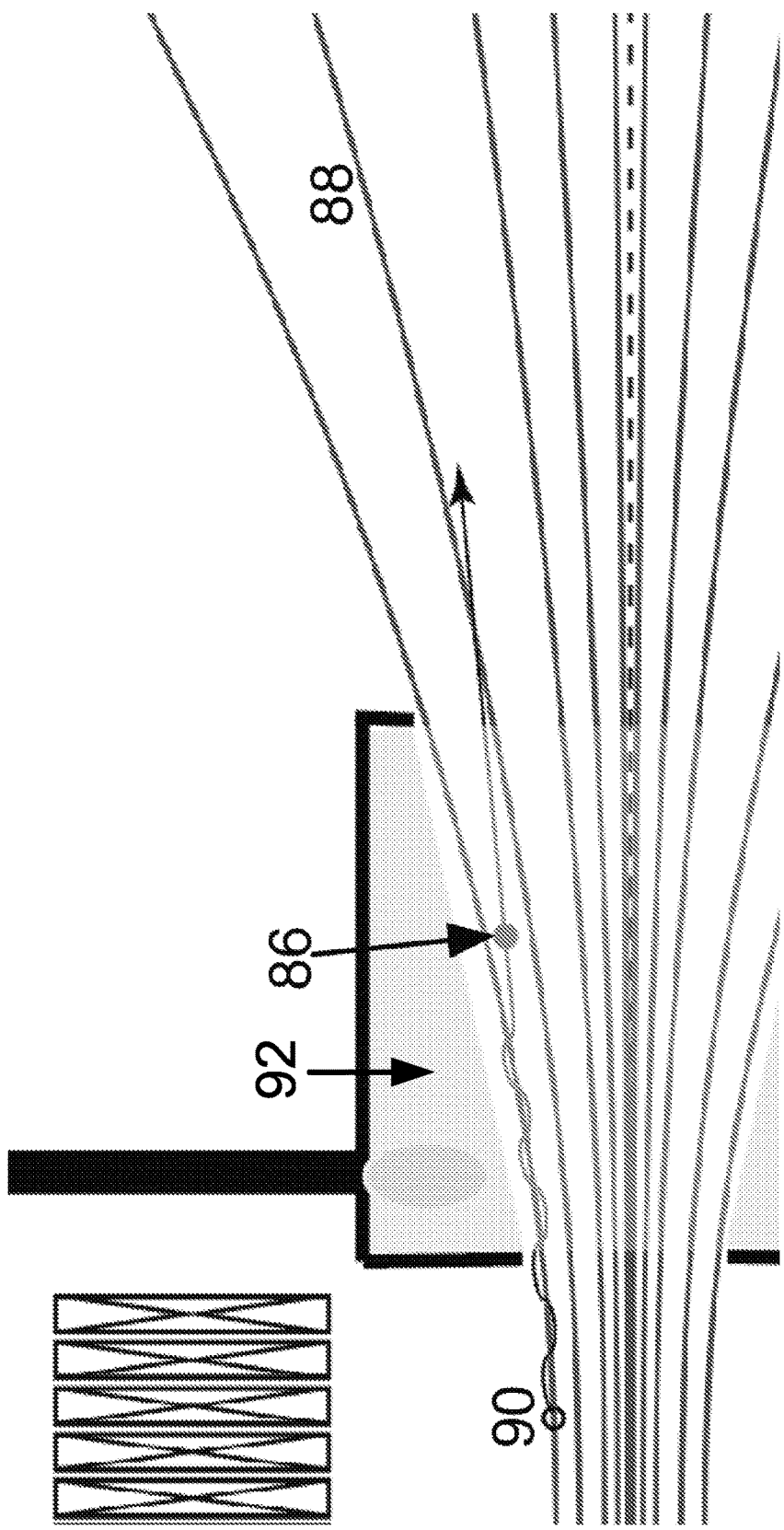
FIG. 6 shows a plasma detachment method using charge-exchange.

To create useful thrust, the propellant must detach from the magnetic field lines of the rocket engine because these field lines eventually reverse direction and return to the rocket's nose. Detachment may be brought about by a number of processes, one of which is depicted in FIG. 6. Since neutral atoms 86 are not bound to the field lines 88, one generic method is to neutralize the ions 90 by attaching electrons to them. This can be done in the same way as the neutral beam is generated, using charge-exchange in a gas box 92, or less easily by radiative recombination. Another detachment method is to unmagnetize the ions by accelerating them to such high speeds that their gyroradii greatly exceed the rocket size. Finally, the plasma pressure of the exiting propellant can be increased to the point where it exceeds the magnetic field energy density. For an expanding plasma, the ratio of the plasma pressure to the magnetic field energy density naturally increases with increasing distance from the magnetic nozzle. Eventually this causes the entire flowing "blob" of plasma to tear itself away from the magnetic field.

As mentioned above, an important disadvantage of conventional fusion engines is that, while providing high specific impulse, they provide relatively low thrust. The system described above overcomes this disadvantage by augmenting thrust through the injection of feedstock propellant gas into scrape-off-layer surrounding the fusioning plasma. This fusion engine with augmented thrust capability is achieved with a substantially smaller reactor than conventional systems. This reduces the amount of helium-3 fuel required to sustain a reaction leading to longer mission duration times. Finally, the thrust augmentation system described above provides more precise control of the augmentation processes, leading to increased efficiency.

Although the scenarios herein have been described with reference to particular embodiments, it is to be understood that these embodiments are merely illustrative of the principles and applications of the disclosed scenarios. It is therefore to be understood that numerous modifications may be made to the illustrative embodiments and that other arrangements may be devised without departing from the spirit and scope of the disclosed scenarios as defined by the appended claims.

The invention claimed is:

1. A system comprising a rocket engine employing nuclear fusion with thrust augmentation, the system comprising
a reactor chamber for containing a stable plasma comprising a fusion fuel;
a heating system for heating said plasma and increasing an ion energy of said plasma to at least 5 kiloelectronvolts for producing power from fusion reactions in said stable plasma;
a plurality of magnets coaxial to said reactor chamber, the plurality of magnets producing a magnetic field to confine the stable plasma and promote rapid loss of fusion products into a scrape off layer;
a fuel injection system for injecting additional quantities of said fusion fuel to sustain the power output of said fusion reaction;
a gas box at one end of said scrape off layer for ionizing a cold propellant gas into a cold propellant plasma for introduction into said scrape off layer to augment the mass of said scrape off layer, wherein said cold propellant plasma is introduced into the reactor chamber and heated in the reactor chamber by fusion reaction products to form a warm propellant plasma;
a propellant injection system for injecting said cold propellant gas into said gas box;
a magnetic nozzle, attached to the end of the reactor chamber distal from said gas box, for directing said warm propellant plasma in said scrape off layer out of said reactor chamber as expelled propellant to create thrust.

2. The system of claim 1 wherein said fusion fuel comprises deuterium and helium-3.

3. The system of claim 1 wherein said plurality of magnets in conjunction with said plasma produces a magnetic field in a field-reversed configuration.

4. The system of claim 3 wherein the magnets are superconducting magnetic coils.

5. The system of claim 4 wherein the magnets are permanent magnets.

6. The system of claim 3 wherein the fuel injection system is a neutral beam.

7. The system of claim 6 wherein the propellant is deuterium.

8. The system of claim 6 wherein the propellant is hydrogen.

9. The system of claim 6 further comprising at least one energy conversion system.

10. The system of claim 9 wherein the heating system employs radio frequency odd-parity rotating magnetic fields produced by radio frequency magnetic coils.

11. The system of claim 10 further comprising a shield for attenuating and deflecting radiation produced from fusion.

12. The system of claim 11 wherein said reactor chamber is a vacuum vessel which is transparent to radio frequencies.

13. The system of claim 1, wherein the stable plasma has a plasma radius of approximately 25 centimeters.

14. The system of claim 1, wherein ions in the stable plasma have an ion gyroradii of about one tenth of a plasma radius of the stable plasma.

15. The system of claim 1, further comprising a charge exchange chamber that neutralizes the expelled propellant to form a neutral stream, and causing the neutral stream to separate from said magnetic field.

16. A method for augmenting the thrust a fusion powered rocket engine that includes a reactor chamber for containing a stable plasma comprising a fusion fuel, a plurality of magnets coaxial to the chamber, a heating system, a fuel injection system, a propellant injection system coupled to a gas box at one end of the reactor chamber, and a magnetic nozzle at the end of the chamber distal to the gas box, the method comprising:

injecting, by the fuel injection system, the fusion fuel into the reactor chamber;

heating, by the heating system, the plasma such that the fuel is ionized and heated such that a sustained nuclear fusion reaction occurs in the plasma producing power;

forming, by the magnets, a magnetic field to confine the plasma and promote rapid loss of fusion products into a scrape-off-layer;

injecting, by the propellant injection system, a cold propellant gas into the gas box;

ionizing the cold propellant gas in the gas box to form an ionized cold propellant plasma;

injecting the ionized cold propellant into the reactor chamber and converting said cold ionized propellant plasma into a warm propellant plasma to increase the mass of the scrape-off-layer, wherein the warm propellant plasma is heated by the fusion products as it flows through the scrape-off-layer;

expelling the warm propellant plasma and fusion products from the reactor chamber through the magnetic nozzle to create thrust.

17. The method according to claim 16 wherein said fusion fuel comprises deuterium and helium-3.

18. The method according to claim 16, where in a field-reversed magnetic field configuration is produced by the plurality of magnets in conjunction with the plasma.

19. The method according to claim 18, wherein plurality of magnets are superconducting magnetic coils.

20. The method according to claim 19, wherein the plurality of magnets are permanent magnets.

21. The method according to claim 18, wherein the fusion fuel is injected by a neutral beam.

22. The method according to claim 21, wherein the injected propellant is deuterium.

23. The method according to claim 21, wherein the injected propellant is hydrogen.

24. The method according to claim 21, further comprising converting energy from the fusion products into electricity.

25. The method according to claim 24, wherein the heating is accomplished by radio frequency odd-parity rotating magnetic fields produced by radio frequency magnetic coils.

26. The method according to claim 25, wherein converting the energy is accomplished by capturing electro-magnetic radiation in the radio frequency spectrum using radio frequency magnetic coils.

27. The method according to claim 26, further comprising attenuating and deflecting radiation produced from the fusion reaction with a shielding material.

28. The method according to claim 27, wherein heating by radio frequencies is enabled by the use of a vacuum vessel for the reactor chamber, which is transparent to such frequencies.

29. The method of claim 16, wherein the stable plasma has a plasma radius of approximately 25 centimeters.

30. The method of claim 16, wherein ions in the stable plasma have an ion gyroradii of about one tenth of a plasma radius of the stable plasma.

31. The method of claim 16, wherein the warm propellant plasma and fusion products are expelled propellant, the method further comprising forming a neutral stream by neutralizing the expelled propellant and detaching the expelled propellant from said magnetic field.

\* \* \* \* \*